Dec. 6, 1938.   E. A. HALBLEIB ET AL   2,139,365
FRICTIONALLY HEATED TIME ELEMENT
Filed Oct. 19, 1936   2 Sheets-Sheet 1

Inventors
Edward A. Halbleib
Henry C. Rohr &
Cyril T. Wallis
By Blackmore, Spencer & Flint
Attorneys Dec. 6, 1938.   E. A. HALBLEIB ET AL   2,139,365
FRICTIONALLY HEATED TIME ELEMENT
Filed Oct. 19, 1936   2 Sheets-Sheet 2

Inventors
Edward A. Halbleib
Henry C. Rohr &
Cyril T. Wallis
By Blackmore, Spencer & Flint
Attorneys Patented Dec. 6, 1938

2,139,365

UNITED STATES PATENT OFFICE 2,139,365

FRICTIONALLY HEATED TIME ELEMENT

Edward A. Halbleib, Henry C. Rohr, and Cyril T. Wallis, Rochester, N. Y., assignors to General Motors Corporation, Detroit, Mich., a corporation of Delaware Application October 19, 1936, Serial No. 106,494

9 Claims. (Cl. 172—36)

This invention relates to time elements and more specifically to elements adapted to operate within a predetermined time period and in which the operating means is a source of heat.

There are a great many instances in which it is necessary for safety purposes of operation to have some device which will operate to perform certain functions after a set predetermined time under certain conditions. Most of these safety devices are applied to shut down a particular construction or apparatus in case the apparatus does not go through the normal cycle.

While the present invention has a multiplicity of adaptations for usage, it will be described with relation to a safety time element used in connection with a burner motor for supplying liquid fuel.

In the normal operation of an oil burner the main control for the periods of operation thereof is generally a thermostat located in the space to be heated. When the temperature of this space is below a certain predetermined level the thermostat closes the circuit to the motor causing the same to operate until the temperature is brought back up to the desired level. However, in case the thermostat closes the circuit and the motor begins to discharge a combustible fluid into the combustion chamber, if for any reason the burner does not ignite, there must be some safety device for cutting off the same. This is also true in case that during normal operation of the burner the flame might be extinguished before the temperature level of the space to be heated had risen to the desired point and therefore the motor would continue to throw oil or other similar fluid into the chamber with the attendant danger of an explosion.

It is therefore the object of this invention to provide a time element to be used for safety means.

It is a further object of our invention to provide a thermally heated safety means applicable to oil burners.

It is a still further object of our invention to provide a frictionally heated thermo means for the above purposes.

With these and other objects in view our invention resides in the construction as described in the following specification and claims and set forth in the accompanying drawings, in which;

Figure 1:
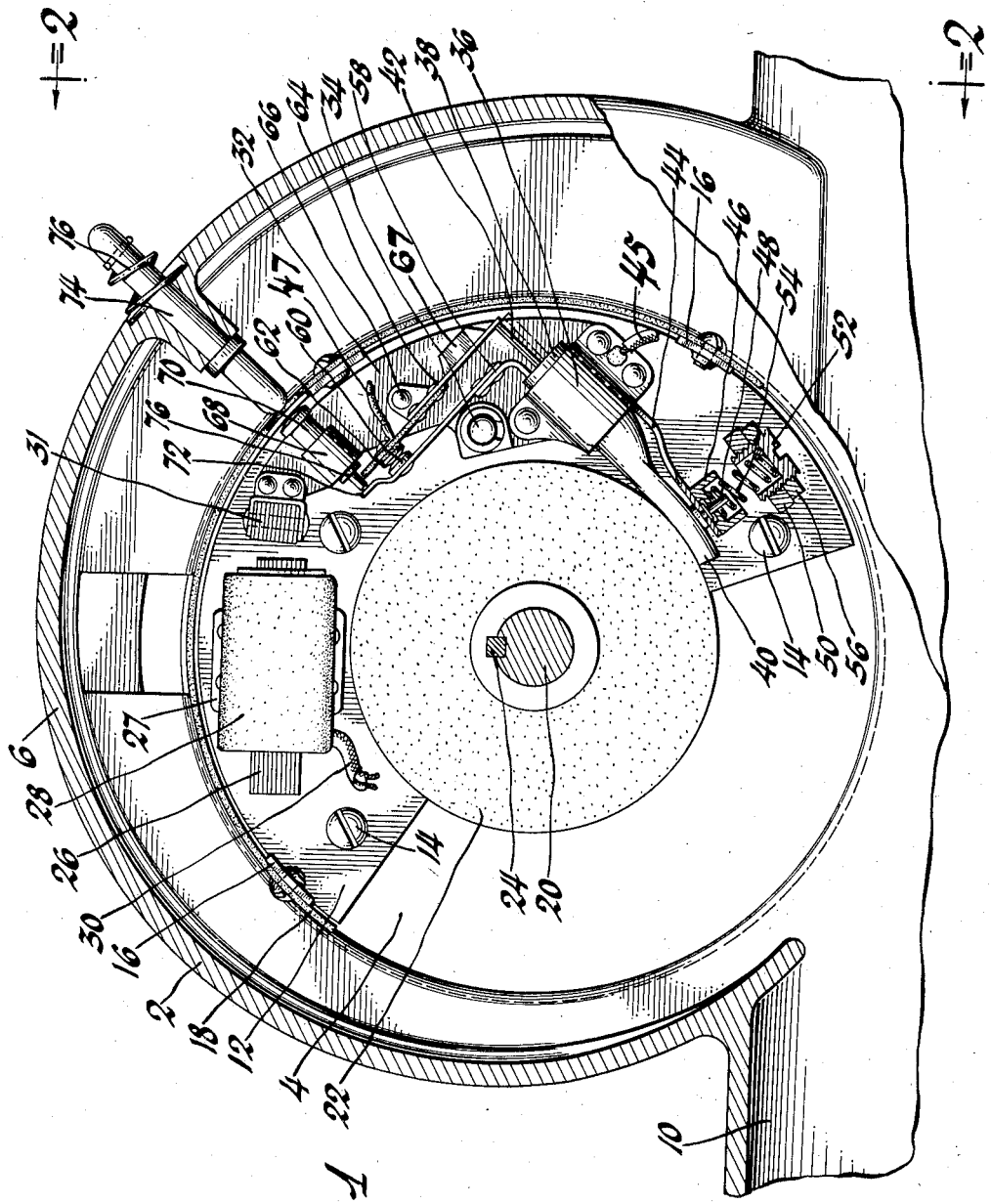
Figure 1 is a vertical section through one end of the housing of a motor taken on line 1—1 of Figure 2.
Figure 2:
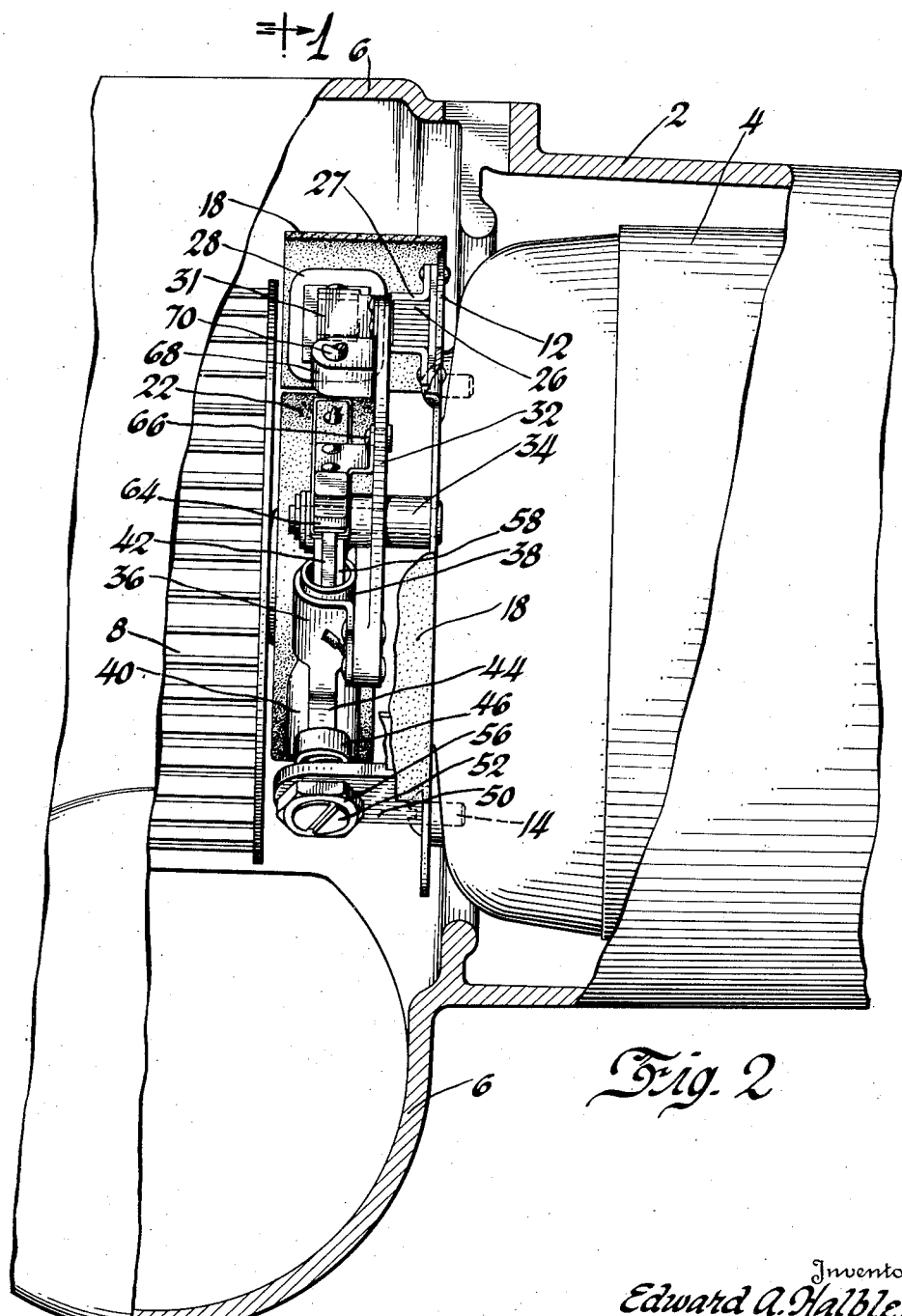
Figure 2 is an elevation partly in section at right angles to the showing of Figure 1 on the line 2—2 thereof.

Within an irregularly shaped outer housing 2 is supported an electric motor 4, one end of the housing 2 being of snail shape as shown at 6 and within which portion is secured a rotatable blower 8 to the shaft of the motor 4 by any suitable means. When the motor rotates the blower air will be discharged from the snail shaped portion of the casing out through a portion 10 as shown in Figure 1.

The particular apparatus of our invention is situated on the motor between the casing 4 and the blower 8 and is adapted to control the rotation of said motor for safety purposes. Secured to the end of the casing 4 is a portion of a circular disk 12 which is secured by tap screws 14. This portion of the disk has an opening in the center thereof through which the motor shaft projects. On the outer periphery of the member 12 there are a series of upturned members 16 and to these members is secured a substantially semicircular band 18 which surrounds and tends to protect the apparatus. Secured to the motor shaft 20 at a position within the band 18 is a disk 22 which is formed of suitable friction material such as a material which might be used for brake lining, said disk 22 being keyed to the shaft by key 24 and therefore adapted to rotate with said shaft. Secured to the upper portion of the member 12 by bracket 27 is a magnetic coil 28 which may be connected by line 30 to any desired mechanism as will be later explained. The bracket 27 and core 26 of the coil 28 has supported near one end a movable armature member 31, said armature member being secured upon one end of an irregularly shaped arm 32, said arm being pivoted upon a pin 34 on the member 12. The arm 32 also carries a U-shaped bracket 36 within which is clamped one end of a tube 38, the lower end of which is pressed flat as shown at 40 and clamps therein one end of a bimetal strip 42 which projects out of the other end of the tube. This tube 38 is preferably of copper for its heat transferring properties.

Also clamped between the tube 38 and the bracket 36 is an angular arm 44 which extends downwardly at a short distance from the pressed lower end of the tube 40 and carries at its lower extremity a cup-shaped device 46 which is secured thereto by a rivet 48.

Extending upwardly from the surface of the member 12 is a lug 50 which carries therein an adjustable screw-threaded cup member 52 which is adapted to be in alignment with the aforementioned member 46 and in the two aligned cavities is carried a helical compression spring 54. To the outer threaded end of the member 52 is applied a lock nut 56 for locking the member in adjusted position. It will thus be evident that as the arm 32 is swung about its pivot the copper tube will also be moved back and forth which will cause more or less compression of the spring 54. The copper tube is adapted to contact with the periphery of the friction disk 22 and is shaped to conform thereto for a certain area, the spring 54 of course assisting to hold the tube 40 firmly against the friction wheel. However, if the armature 31 is attracted by the electro-magnet 28, arm 32 will be rotated about its pivot 34 in a counterclockwise direction which will cause the spring 54 to be compressed and the tube 40 to be moved out of contact with the disk 22.

Supported within the upper edge of the copper tube 38 is an angular bracket 58 to which is secured a substantially stationary contact 60. In juxtaposition to the contact 60 there is a second contact 62 movably supported in this relation on a pivoted arm 64 which is pivoted at 66 to the arm 32. The end of the bimetallic element 42 which projects from the copper tube 38 extends under one end of the lever 64 to maintain it in its uppermost position and to maintain contact 62 in contact with 60. It should be noted that lever 64 is composed of two materials, the material adjacent contact 62 being of insulated substance for circuit connections. Arm 32 also has an upstanding, substantially circular portion 68 through which a plunger 70 extends, the tip of which is adapted to press against the end of lever 72 which carries the substantially stationary contact 60, said plunger 70 being adapted to be moved by an aligned plunger 74 which extends through the outer casing 2 and which has a biasing spring 76 to hold it normally in non-engaging position.

It should also be noted that the plunger 70 has a shoulder 76 which bears against the insulating end of the lever 64 to assist in the resetting process which is carried out by pressing the outer plunger 74. The normal operation of this resetting mechanism is that when the bimetallic element 42 has become heated to such an extent to move to the dotted line position shown in Figure 1, that the lever 64 will rotate in a clockwise direction about its pivot 66 due to weight 67. This will cause the contacts 62 and 60 to operate stopping the motor. When it is desired to reset the same at a time when the bimetallic element has cooled, the tip of the plunger 70 upon being pressed in depresses the contact 60 away and then rotates the lever 64 in a counterclockwise direction until the end of the bimetallic member 42 may slide under and retain it in its position as shown. During this time it should be noted that the contact 60 is being held a distance from contact 62 so that unless the bimetallic element has cooled sufficiently to retain the lever 64 in its given position, the contacts 60 and 62 cannot close to again maintain the motor circuit.

The arm 44, which is clamped between the tube 38 and the supporting bracket 36, is insulated from the tube 38 by any conventional means such as a sheet of insulating material, not shown, said arm 44 then extending downwardly and carrying at the end the aforementioned cup 46 by the rivet contact 48. Thus the flow of the current from the motor circuit comes in through cable 45, through bracket 36, arm 44, contact 48, tube 38, arm 58, contact 60, contact 62 and cable 47 back out to the motor circuit. This particular path of the current, and especially that portion through rivet contact 48 and the lower portion of the tube 48, is designed so that if anything happens to the spring 54 due to the action of spring 44 the contact 48 will disengage causing an opening of the motor circuit and inoperability of the device until the said spring has been repaired or replaced so that there will always be a sufficient amount of friction to operate the normal time device.

The normal operation of the whole device is therefore as follows: Assuming first that contacts 60 and 62 are directly in the circuit necessary for operating the motor and that coil 28 is operated by some function which is the result of normal operation of the device, through some extraneous set of circumstances therefore the motor circuit is closed and the motor starts up, the friction disk 22 rubbing against the lower end 40 of the copper tube and heating the same through friction, this heat being transferred to the bimetallic element 42 which begins to move toward the right as shown in Figure 1. If the device is a burner and coil 28 is controlled by the conventional stack switch, then upon the actuation of the stack switch under normal temperature rise, magnet 28 will be energized to attract its armature 31 which rotates arm 32 about its pivot 34 and pulls the copper heat member away from its contact with the friction disk 22 and therefore the contacts 60 and 62 remain together and the motor continues to run. However, if for some reason normal heating is not acquired, the friction member will continue to bear against the friction disk and the bimetallic element 42 will become heated to a point where it moves out from under the lever 64 allowing it to fall and contacts 60 and 62 to open which stops the motor and under these circumstances it will require a manual reset.

We claim:

1. In a device of the class described, operating means, control means therefor, heat actuated means for operating the control means, friction means actuated by operation of the first named means to supply heat for the heat actuated means and means for eliminating the friction and thus prevent the operation of the heat actuated means.

2. In a device of the class described, a motor, a switch controlling the operation thereof, a bimetallic element effecting switch operation, friction means actuated by normal motor operation to supply heat to the bimetallic element for switch operation and means to eliminate the friction means and thus prevent operation of the bimetallic element.

3. In a safety device, a rotatable member, a member adapted to bear thereagainst thus causing friction and heat generation, a bimetallic element in contact with the second member and receiving heat therefrom, switching means adapted to be actuated by the bimetallic member for controlling the rotatable member and means for moving the member bearing thereagainst from contact with the rotatable member and thus prevent heating of the bimetallic element.

4. In a safety device, a motor, a switch therefor, a bimetallic element and a holder therefor, a pivoted arm mounted on the motor, said switch and bimetallic element and holder being mounted on the arm with the bimetallic element in juxtaposition to the switch to operate the same, a friction disk rotated by the motor against which the holder bears whereby heat is generated to move the element and operate the switch.

5. In a safety device, a motor, a switch therefor, a bimetallic element and a holder therefor, a pivoted arm mounted on the motor, said switch and bimetallic element and holder being mounted on the arm with the bimetallic element in juxtaposition to the switch to operate the same, a friction disk rotated by the motor against which the holder bears whereby heat is generated to move the element and operate the switch, resilient means to bias the holder against the disk and means to pull the holder out of contact with the disk to prevent switch operation.

6. In a safety device, a motor having a casing, a switch therefor having contacts mounted in the casing, heat sensitive means for operating the switch, a source of friction heat generated by motor rotation to affect the heat sensitive means and cause switch operation, and a normal reset means extending through the casing to engage the contacts for reset.

7. In a safety device, a motor having a stator and a rotor, a bracket pivoted on the stator, a friction disk carried by the rotor, a holder secured to the bracket and adapted to bear against the friction disk, resilient means to force the holder against the disk, switching means for controlling the motor mounted on the bracket and biased to open position, temperature responsive means in the holder and contacting the switching means to maintain the latter closed when it is cold but upon heating due to friction to move to one side and allow the switch to open and electrically energized means to move the bracket about its pivot and thus the holder from contact with the friction disk to prevent heating.

8. In a safety device, a motor having a stator and a rotor, friction means carried by the rotor, thermostatic motor switching means pivoted to the stator and adapted to bear against the friction means whereby the supply of frictional heat will cause actuation of the switching means, resilient means to force the two friction surfaces together and electromagnetic means to swing the switching means about its pivot to part the friction surfaces and prevent further heating.

9. In a safety device, a motor having a stator and a rotor, friction means carried by the rotor, thermostatic motor switching means pivoted to the stator and adapted to bear against the friction means whereby the supply of frictional heat will cause actuation of the switching means, resilient means to force the two friction surfaces together, electromagnetic means to swing the switching means about its pivot to part the friction surfaces and prevent further heating and resetting means on the stator to close the switching means if actuated by the heat of friction.

EDWARD A. HALBLEIB.
HENRY C. ROHR.
CYRIL T. WALLIS.